United States Patent
Feuser et al.

(10) Patent No.: US 7,640,437 B2
(45) Date of Patent: Dec. 29, 2009

(54) ADDRESS ENCRYPTION METHOD FOR FLASH MEMORIES

(75) Inventors: Markus Feuser, Hamburg (DE); Sabine Sommer, Stelle (DE)

(73) Assignee: NXP B.V., Eindhoven (NL)

( * ) Notice: Subject to any disclaimer, the term of this patent is extended or adjusted under 35 U.S.C. 154(b) by 647 days.

(21) Appl. No.: 10/537,517

(22) PCT Filed: Nov. 19, 2003

(86) PCT No.: PCT/IB03/05271

§ 371 (c)(1),
(2), (4) Date: Jun. 3, 2005

(87) PCT Pub. No.: WO2004/051482

PCT Pub. Date: Jun. 17, 2004

(65) Prior Publication Data

US 2006/0101284 A1  May 11, 2006

(30) Foreign Application Priority Data

Dec. 4, 2002  (DE) ............................. 102 56 587

(51) Int. Cl.
 G06F 11/30 (2006.01)
 G06F 12/14 (2006.01)
 G06F 13/00 (2006.01)

(52) U.S. Cl. ............... 713/190; 713/189; 713/193; 726/27; 711/163; 711/164; 711/216

(58) Field of Classification Search ............... 713/193, 713/190, 189; 711/163, 164, 216; 726/27
See application file for complete search history.

(56) References Cited

U.S. PATENT DOCUMENTS

| 5,081,675 | A | | 1/1992 | Kittirutsunetorn | |
|---|---|---|---|---|---|
| 5,754,659 | A | * | 5/1998 | Sprunk et al. | 380/30 |
| 7,124,303 | B2 | * | 10/2006 | Candelore et al. | 713/193 |
| 7,151,832 | B1 | * | 12/2006 | Fetkovich et al. | 380/210 |
| 2001/0037450 | A1 | | 11/2001 | Utyansky et al. | |
| 2002/0048372 | A1 | * | 4/2002 | Toh et al. | 380/285 |
| 2003/0026423 | A1 | * | 2/2003 | Unger et al. | 380/217 |
| 2004/0039908 | A1 | * | 2/2004 | Rose et al. | 713/168 |
| 2007/0118763 | A1 | * | 5/2007 | Kamei | 713/190 |
| 2008/0019528 | A1 | * | 1/2008 | Kneissler | 380/279 |
| 2008/0229115 | A1 | * | 9/2008 | Wollnik et al. | 713/190 |
| 2009/0052662 | A1 | * | 2/2009 | Oxford | 380/43 |

FOREIGN PATENT DOCUMENTS

EP  0 908 810  4/1999

OTHER PUBLICATIONS

Daimen J et al: "On the Design of High Speed Self-Synchronizing Stream Ciphers" Singapre ICCS/ISITA '92. Nov. 16, 1992, pp. 279-283.

* cited by examiner

*Primary Examiner*—William R Korzuch
*Assistant Examiner*—Sarah Su

(57) ABSTRACT

An electronic memory component provides a plurality of access-secured sub-areas. Each access-secured memory sub-area has at least one assigned parameter, for example, an address. The memory encrypts the assigned parameters of the access-secured sub-areas in such a way that on the one hand the security of such devices is increased considerably and on the other hand the associated expense and technical complexity are not too great. The encryption allows access to at least one sub-area dependent on at least one further sub-area.

5 Claims, 3 Drawing Sheets

ADDRESS ENCRYPTION METHOD FOR FLASH MEMORIES

BACKGROUND OF THE INVENTION

The present invention relates to a data processing device, in particular an electronic memory component, comprising a plurality of access-secured sub-areas, in particular a plurality of access-secured memory areas, each having at least one assigned parameter ($a_n, a_{n-1}, \ldots, a_1, a_0$), in particular address.

The present invention further relates to a method of encrypting at least one parameter ($a_n, a_{n-1}, \ldots, a_1, a_0$), in particular the address, of at least one access-secured sub-area, in particular at least one access-secured memory area, of at least one data processing device, in particular at least one electronic memory component.

In known methods of encrypting confidential data, such as personal data, key data or otherwise sensitive data, a non-volatile memory unit can only be encrypted as a complete physical memory in a generally fixed manner; this means that access can only be denied to memories in their entirety.

This method, known from the prior art, of encrypting entire integrated circuit (IC) areas is considered disadvantageous in view of the high cost together with its technical complexity and lack of flexibility. For this reason, it is desirable to develop alternative methods of encrypting access-secured memory areas or sub-areas.

If, for instance, to control a memory of the size $M=2^i=2^{n+1}$ with i=n+1 address buses, when these address buses are encrypted over the entire address space, modification of one address bus would have the possible effect of modifying a plurality of address buses, indeed even those address buses which ensure that a physically remote memory cell is addressed.

This is not sensible for a number of a memory types, including in particular memories that are organized into areas, such as erasable programmable read only memory (EPROM), electrically erasable programmable read only memory (EEPROM) or Flash memory. Separation of the address buses into a number of areas and subsequent independent encryption of each of the individual areas is inadequate, however, with regard to security.

Taking as basis the above-described disadvantages and shortcomings and acknowledging the outlined prior art, it is an object of the present invention to develop a data processing device, in particular an electronic memory component, of the above-mentioned type, together with an encryption method related thereto, that the security of the device is increased considerably and the expense associated therewith and the technical complexity are not too great.

DETAILED DESCRIPTION

The present invention provides a completely novel approach to area-wise encryption of memory contents, i.e., a new method is disclosed for encrypting access-secured memory sectors of non-volatile nature and/or other sub-sectors.

To this end, the present invention allows parts of the (address) parameters of the memory areas to be encrypted in different ways with regard to the object and/or with regard to the customer and/or with regard to the "die". This means that some sub-areas or sectors of the address do not affect all the addresses, unlike in the prior art.

According to the invention, therefore, encryption of one access-secured sub-area, in particular an access-secured memory area, is performed while taking account of the other respectively available sub-areas, in particular memory areas. This makes it possible to encrypt each sub-area with in each case different parameters.

Figure 1:
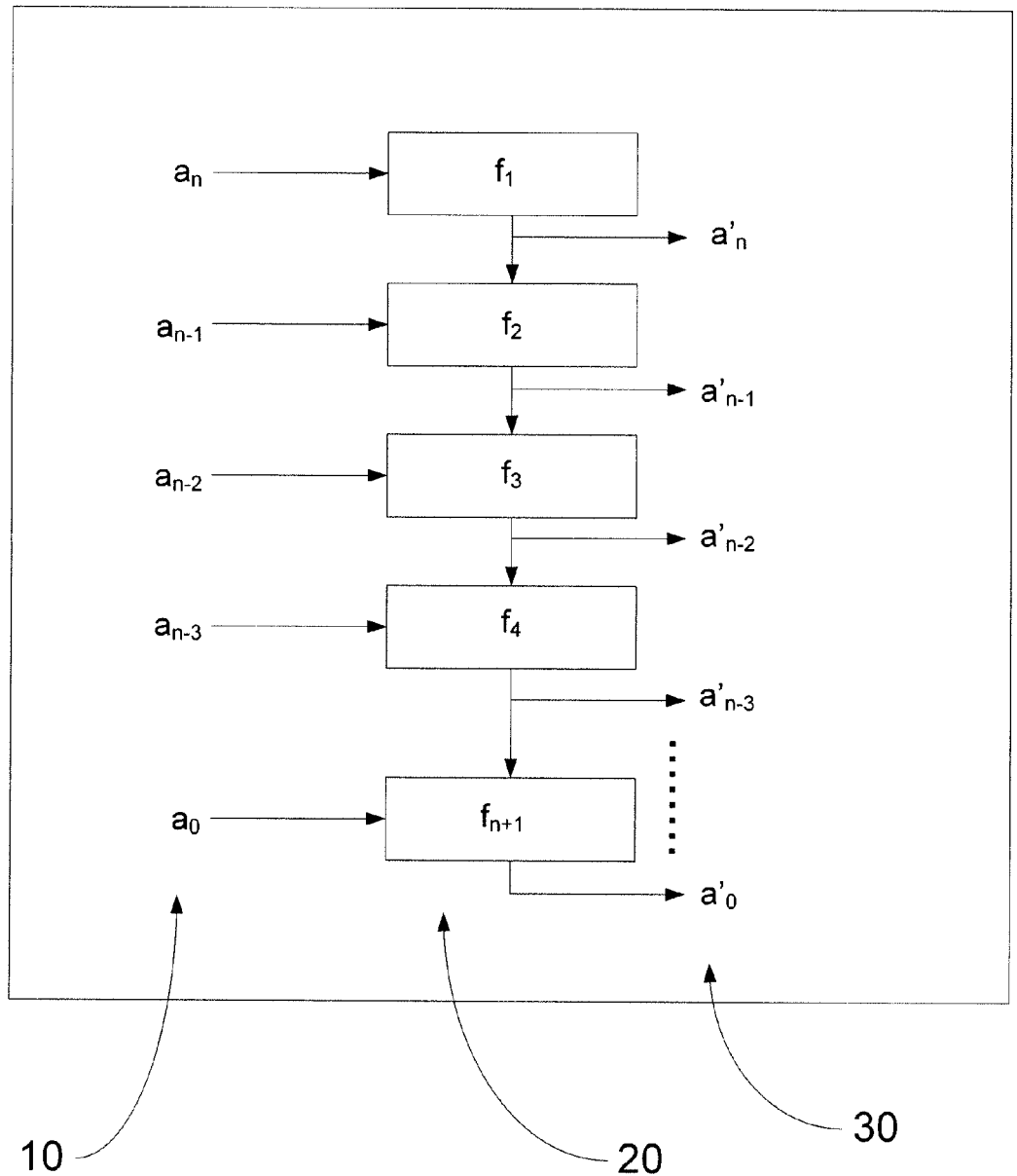
FIG. 1 shows an address encryption block according to aspects of the invention.

In an embodiment of the present invention shown in FIG. 1, an encryption block 5 receives an unencrypted address 10 of the form $a_n, a_{n-1}, \ldots, a_1, a_0$ may take the following appearance, in accordance with the above-described encryption method: $f_1(a_n)$, $f_2(f_1(a_n)+a_{n-1})$, $f_3(f_2(f_1(a_n)+a_{n-1})+a_{n-2})$, ..., $f_{n+1}(f_n(f_{n-1}(\ldots)))$, i.e. an unencrypted address of the form $a_n, a_{n-1}, \ldots, a_1, a_0$ may be mapped by i=n+1 (scramble) functions $f_i$ into an encrypted address 20 of the form $a'_n, a'_{n-1}, \ldots, a'_1, a'_0$.

In this context, it is obvious that although variation of the parameter $a_n$, in particular of the address parameter, may influence all the other address buses, variation of the parameter $a_{n-1}$ does not have any influence on the most significant function $f_1(a_n)$.

It is expedient for $f_i(a)$ to be any desired one-to-one function, i.e. there are precisely $2^i$ plain/cipher pairs, wherein an unencrypted address $a_n, a_{n-1}, \ldots, a_1, a_0$ is always transformed into a unique encrypted address $a'_n, a'_{n-1}, \ldots, a'_1, a'_0$. On the other hand, the function $f_i$ itself does not have to be bijective, i.e., it does not have to be reversible.

In an advantageous further embodiment of the present invention, not all stages have to be fully performed, i.e., some functions $f_i$ may directly reproduce the relevant address bit: a'=a. Alternatively or in addition thereto, the address buses may also be grouped; this may appropriately mean, inter alia, that the inputs to the functions $f_i$ and the return values from the functions $f_i$ may be several bits wide.

Figure 2:
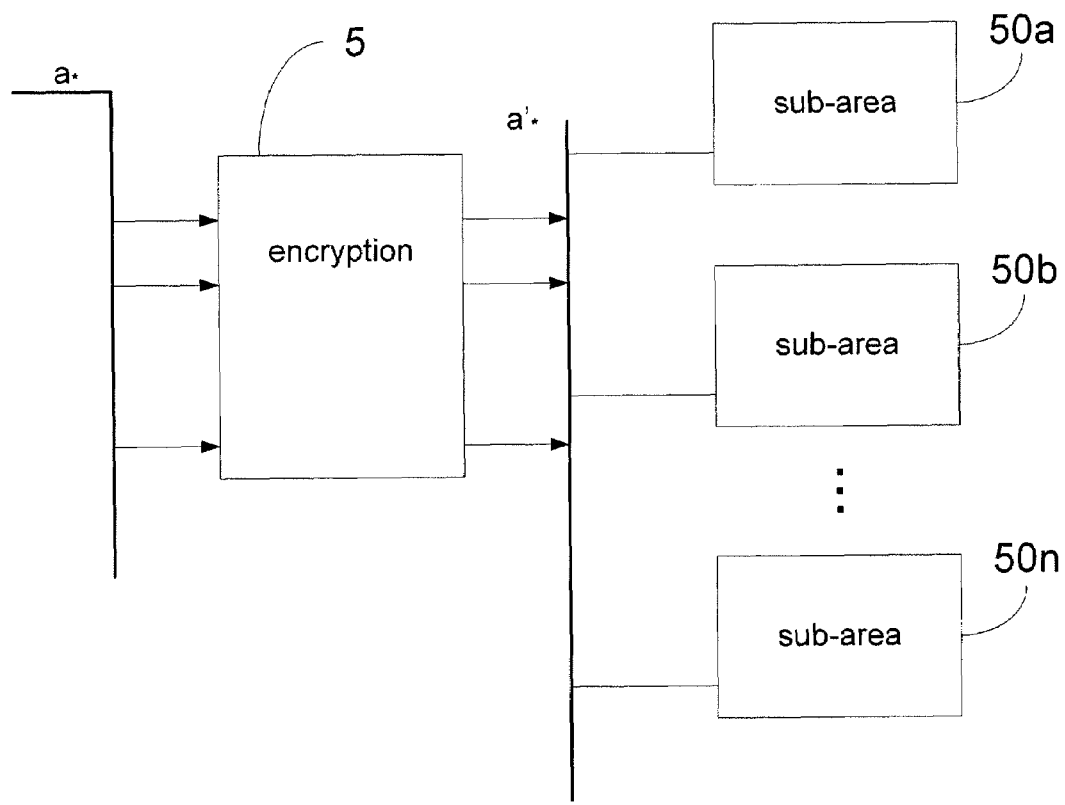
FIG. 2 shows a block diagram of a memory according to aspects of the invention.

In an advantageous embodiment of the present invention, as shown in FIG. 2 for EPROM memories or for EEPROM memories division into two sub-areas 50a, 50b with functions $f_i(a_n, \ldots, a_x)$ and $f_2(f_1(a_{x-1}, \ldots, a_0))$ is useful and for flash memories division into three sub-areas 50a, 50b, 50n with functions $f_i(a_n, \ldots, a_x), f_2(f_1(a_{x-1}, \ldots, a_y))$ and $f_3(f_2(f_1(a_{y-1}, \ldots, a_0)))$ is useful.

According to a particularly inventive further embodiment, access-secured memory areas may be separately secured, i.e. boundary conditions which require a physical memory are fully utilized by the new method (the wide variety of encryptions is here limited only insignificantly).

Figure 3:
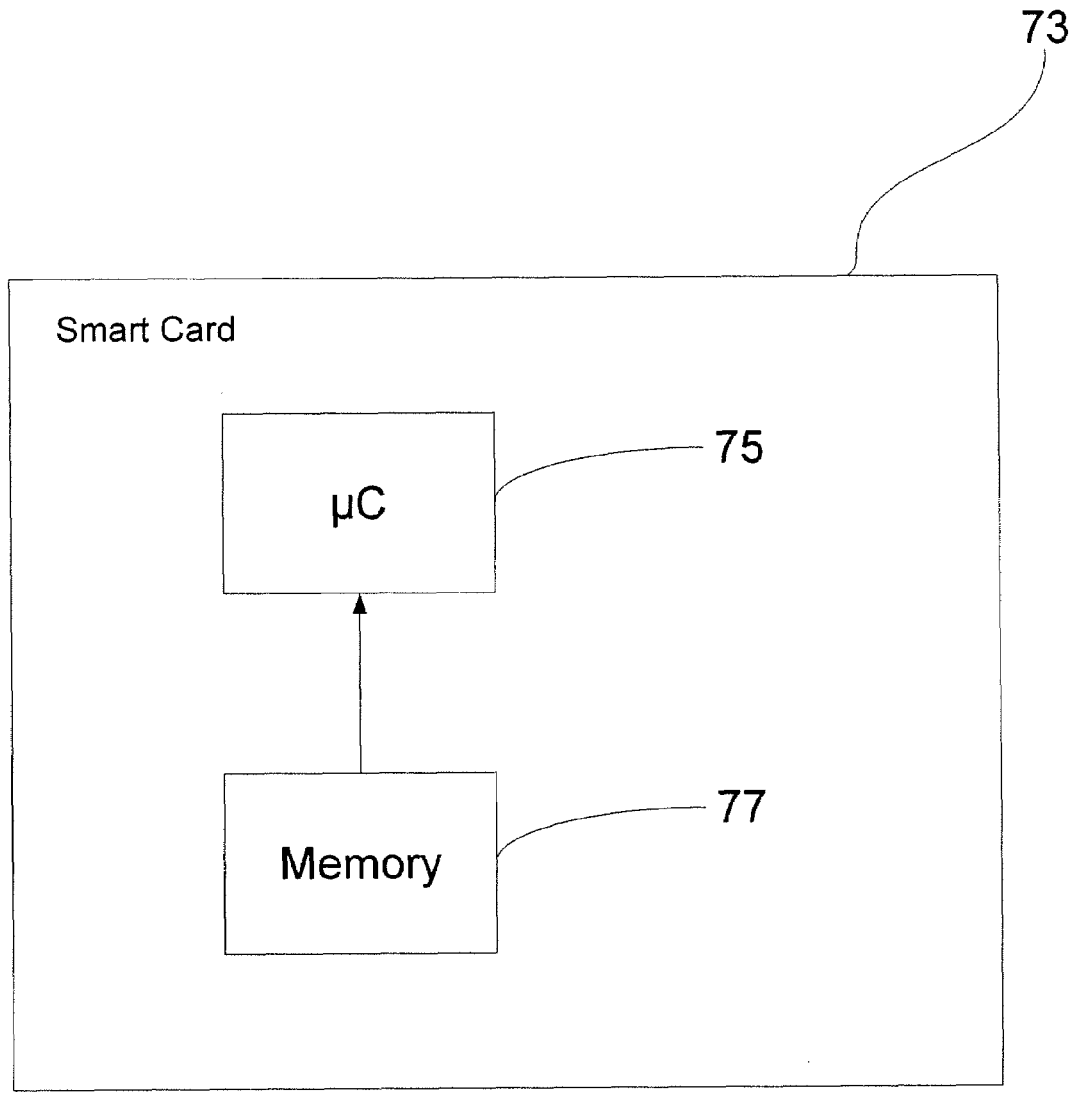
FIG. 3 shows a block diagram of a smart card according to aspects of the invention.

As shown in FIG. 3, the present invention further relates to a microcontroller, in particular a smart card controller 73, comprising at least one data processing device 75 of the above-described type. Accordingly, the above-described method may preferably be built into all smart card designs, for example.

The present invention finally relates to the use of at least one data processing device, in particular at least one electronic memory component 77, of the above-described type in at least one chip unit, in particular in at least one smart card controller, in at least one reader IC or in at least one crypto chipset, for example, in the field of audio and/or video encryption.

As already discussed above, there are various possible ways of advantageously embodying and developing the teaching of the present invention. Reference is made, in this regard, to the claims subordinate to claims 1 and 6, and the invention will be further described with reference to examples of embodiments shown in the drawings to which, however, the invention is not restricted. In the Figures:

FIG. 1 is a schematic block diagram of an example of embodiment of the encryption method according to the present invention applied to a data processing device according to the present invention.

The encryption method according to the present invention for application in an electronic memory component is based on the idea of encrypting unencrypted addresses $a_n$, $a_{n-1}, \ldots, a_1, a_0$ of an access-secured memory area only in certain areas, i.e. in dependence on one or more further memory areas, such that encrypted addresses $a'_n, a'_{n-1}, \ldots, a'_1, a'_0$ are formed.

To this end, $i=n+1$ one-to-one ($\rightarrow 2^i = 2^{n+1}$ plain/cipher-pairs) scramble functions $f_1, f_2, \ldots, f_n, f_{n+1}$ are provided, such that, after mapping, the unencrypted addresses of the form $a_n$, $a_{n-1}, \ldots, a_1, a_0$ have the following appearance when encrypted by the functions $f_i$ (c.f. FIG. 1):

$$f_1(a_n), f_2(f_1(a_n)+a_{n-1}), f_3(f_2(f_1(a_n)+a_{n-1})+a_{n-2}), \ldots,$$
$$f_{n+1}(f_n(f_{n-1}(\ldots)))$$

This makes it possible to encrypt each sub-area with in each case different parameters.

In this context, it is obvious that although variation of the addresses $a_n, a_{n-1}, \ldots, a_1, a_0$ may influence all the other address buses, variation of the parameter $a_{n-1}$, does not have any influence on the most significant function $f_1(a_n)$.

As an alternative to that illustrated in FIG. 1, not all $i=n+1$ stages have to be fully performed, i.e. some functions $f_i$ may also directly reproduce the relevant address bit: $a'=a$.

Furthermore, the address buses may also be grouped; this may mean, inter alia, that the inputs to the functions $f_i$ and the return values from the functions $f_i$ may be several bits wide.

LIST OF REFERENCE NUMERALS $a_0$ first unencrypted address
$a_1$ second unencrypted address
$a^{n-1}$ $n^{th}$ unencrypted address
$a_n$ $n+1^{th}$ unencrypted address
$a'_0$ first encrypted address
$a'_1$ second encrypted address
$a'_{n-1}$ $n^{th}$ encrypted address
$a'_n$ $n+1^{th}$ encrypted address
$f_1$ first function, in particular first scramble function
$f_2$ second function, in particular second scramble function
$f_n$ $n^{th}$ function, in particular $n^{th}$ scramble function
$f_{n+1}$ $n+1^{th}$ function, in particular $n+1^{th}$ scramble function

The invention claimed is:

1. A data processing device, comprising an electronic memory component, the data processing device comprising: an encryption block, said encryption block receiving an address comprised of a series of parameters $a_0, \ldots, a_n$ and applying an encryption method on at least one parameter to produce an encrypted series of parameters $a'_0, \ldots, a'_n$ according to the series:

$$a'_j = \begin{cases} f_{n-j+1}(a_j) & j = n \\ f_{n-j+1}(a_j + f_{n-j}(a_{j+1})) & j = 0, \ldots, n-1 \end{cases}$$

wherein encryption function $f_{j+1}$ and encryption function $f_j$ are distinct for all values of $j$, and for at least a first parameter in said series of parameters, $a'_x \neq a_x$ and for at least a second parameter in said series of parameters, $a'_y = a_y$ where $0 \leq x \leq j$ and $0 \leq y \leq j$.

2. The data processing device as claimed in claim 1, wherein the memory component comprises:
an erasable programmable read only memory,
an electrically erasable programmable read only memory or
a flash memory.

3. The data processing device of claim 1, wherein the data processing device is utilized in at least one of:
a one smart card controller,
a reader integrated circuit,
a cryptography chipset, or
for application in at least one of audio or video encryption.

4. A method of securing access to an electronic memory, comprising:
receiving, by a data processing device, an address comprised of a series of parameters $a_0, \ldots, a_n$; and
encrypting, by said data processing device, at least one of said parameters with an encryption method, to produce an encrypted series of parameters $a'_0, \ldots, a'_n$ according to the series:

$$a'_j = \begin{cases} f_{n-j+1}(a_j) & j = n \\ f_{n-j+1}(a_j + f_{n-j}(a_{j+1})) & j = 0, \ldots, n-1 \end{cases}$$

wherein encryption function $f_{j+1}$ and encryption function $f_j$ are distinct for all values of $j$, and for at least a first parameter in said series of parameters, $a'_x \neq a_x$ and for at least a second parameter in said series of parameters, $a'_y = a_y$ where $0 \leq x \leq j$ and $0 \leq y \leq j$.

5. The method as claimed in claim 4, characterized in that the function is one-to-one, according to the equation $$a'_0 = f_{n+1}(a_0 + f_n(a_1 + f_{n-1}(a_2 + \ldots + f_1(a_n)))).$$

* * * * *